United States Patent
Skillin et al.

(10) Patent No.: US 9,387,965 B2
(45) Date of Patent: Jul. 12, 2016

(54) ONE-PIECE SQUEEZE-TO-DOSE DISPENSING CLOSURE

(71) Applicant: MWV Slatersville, LLC, Slatersville, RI (US)

(72) Inventors: Clifford W. Skillin, Blackstone, MA (US); Richard A. Tarozzi, Gales Ferry, CT (US)

(73) Assignee: WESTROCK SLATERSVILLE, LLC, Norcross, GA (US)

( * ) Notice: Subject to any disclaimer, the term of this patent is extended or adjusted under 35 U.S.C. 154(b) by 19 days.

(21) Appl. No.: 14/460,581

(22) Filed: Aug. 15, 2014

(65) Prior Publication Data
US 2015/0048114 A1    Feb. 19, 2015

Related U.S. Application Data

(60) Provisional application No. 61/867,039, filed on Aug. 17, 2013.

(51) Int. Cl.
| | |
|---|---|
| *B67D 7/06* | (2010.01) |
| *B65D 47/08* | (2006.01) |
| *B65D 50/04* | (2006.01) |
| *G01F 11/28* | (2006.01) |

(52) U.S. Cl.
CPC ........ *B65D 47/0838* (2013.01); *B65D 47/0847* (2013.01); *B65D 50/046* (2013.01); *G01F 11/286* (2013.01)

(58) Field of Classification Search
USPC .................... 222/205, 207, 211, 215, 153.02, 222/153.09, 153.1, 498, 499, 464.1, 54, 5, 222/546, 556, 562, 563
See application file for complete search history.

(56) References Cited

U.S. PATENT DOCUMENTS

| | | | |
|---|---|---|---|
| 4,106,673 A | 8/1978 | Donoghue | |
| 4,418,843 A | 12/1983 | Jackman | |
| 4,474,312 A | 10/1984 | Donoghue | |
| D278,118 S | 3/1985 | Hoyt | |
| 4,660,746 A * | 4/1987 | Wright ................. | G01F 11/286 1/286 |
| 4,747,521 A | 5/1988 | Saffron | |
| 4,971,226 A | 11/1990 | Donoghue | |
| 5,067,638 A | 11/1991 | Bavaveas | |
| 5,224,632 A | 7/1993 | Murakami et al. | |
| 5,330,081 A | 7/1994 | Davenport | |

(Continued)

FOREIGN PATENT DOCUMENTS

| | | |
|---|---|---|
| EP | 0539647 A1 | 10/1993 |
| JP | 2006117262 | 5/2006 |

*Primary Examiner* — Donnell Long
(74) *Attorney, Agent, or Firm* — Barlow, Josephs & Holmes, Ltd.

(57) ABSTRACT

A dispensing closure for dispensing a flowable product from a container has a main body portion, a sealed lid portion, and a hinged closure tab held closed by a child-resistant latch. The main body is securable to a container by a lower skirt portion and includes an interior measuring reservoir. The dispensing closure receives a dip tube extending to the bottom of a container, and upon squeezing the container directs product from the dip tube through an entrance conduit into the dispensing closure. When pressure is released, product flows back into the container through the conduit leaving behind a measured dose within the measuring reservoir. A shroud depending from the lid portion prevents product from being squeezed directly from the entrance conduit out of the exit orifice. A child resistant actuator limits unintended opening of the hinged closure tab.

17 Claims, 16 Drawing Sheets

(56) References Cited

U.S. PATENT DOCUMENTS

| | | |
|---|---|---|
| 5,584,420 A | 12/1996 | Awada et al. |
| 5,833,124 A | 11/1998 | Groves et al. |
| 5,884,816 A | 3/1999 | Hinze |
| 5,967,377 A | 10/1999 | Glynn |
| 6,330,960 B1 | 12/2001 | Faughey et al. |
| 6,334,550 B1 | 1/2002 | De Backer |
| 6,672,485 B2 | 1/2004 | Mascitelli |
| 7,097,071 B2 | 8/2006 | Anderson et al. |
| 7,798,348 B2 * | 9/2010 | Sawyer .............. B65D 47/0809 215/237 |
| 8,579,164 B1 * | 11/2013 | Sanguinet ............. G01F 11/286 1/286 |
| 2005/0133475 A1 * | 6/2005 | Goto .................. B65D 47/0814 215/237 |
| 2012/0000944 A1 * | 1/2012 | Romanov .................. B05B 1/042 222/556 |
| 2014/0034677 A1 * | 2/2014 | Pagliarulo ........... B05B 11/0089 222/158 |

* cited by examiner

ONE-PIECE SQUEEZE-TO-DOSE DISPENSING CLOSURE

CROSS-REFERENCE TO RELATED APPLICATIONS

This application is a non-provisional application of, and claims the benefit to, U.S. Application No. 61/867,039, filed Aug. 17, 2013, the entire contents of which are incorporated herein by reference.

BACKGROUND OF THE INVENTION (1) Field of the Invention

The instant invention relates to dispensing closures for containers for flowable products such as personal care products, concentrated beverages, food products, and healthcare products. More specifically, the invention relates to a dispensing closure having an interior measuring reservoir which is filled by squeezing the product container to fill the closure and automatically measures a predetermined dose of product.

(2) Description of Related Art

Dispensing containers are used in a variety of industries for dispensing various liquid products. For example, dispensing containers may be used for shampoo, lotion, condiments, or beverages. As integrated dispensing closures become more prevalent in all industries, consumers push for their use on an ever expanding array of products and packages, and product manufacturers push for unique solutions and reduced costs to promote sales and maintain profit margins.

SUMMARY OF THE INVENTION

The instant invention describes a one-piece molded dispensing closure for dispensing a predetermined dose of a flowable product from a product container when the user squeezes the container. When squeezed, product flows up to fill the dispensing closure. Thereafter, a release of the pressure on the container allows product in excess of the predetermined dose to flow back into the container, leaving the measured dose within the measuring reservoir. The user then opens an exit orifice, and tips the dispensing closure to dispense the predetermined dose of the product.

The dispensing closure includes a main body portion having a middle deck, from which a lower skirt portion extends downwardly. The lower skirt has an inner surface configured and arranged to be secured to a product container. In the exemplary embodiment, the inner surface is threaded so that it can engage an outwardly threaded neck of a container. An upper skirt extends upwardly from the middle deck and a lid portion is received over the upper skirt.

Once the dispensing closure is secured to the opening of a container, it controls flow of the product from the container. The middle deck has a bottom wall that includes a dip tube receiver for receiving a dip tube that extends to the bottom of the product container. An entrance conduit is formed at an edge of the dip tube receiver and extends upwardly from the bottom wall into the interior of the main body. The entrance conduit has an opening defined at its upper end. The dip tube, dip tube receiver, and entrance conduit together form a continuous path for fluid to pass from the dispensing tube into the interior of the main body.

When the container is squeezed, the flowable product in the container is forced up through the dip tube, through the entrance conduit, and into the interior of the main body. To retain the measured dose of product, the main body includes a measuring reservoir which is defined within the upper skirt extending upwardly from a middle deck on the main body. The bottom wall of the middle deck, the outer surface of the entrance conduit, and the interior surface of the upper skirt together form the interior measuring reservoir within the main body for measuring a predetermined dose of a flowable product. The upper edge of the flow conduit defines the level of product retained within the measuring reservoir.

The top edge of the upper skirt is sealed by a lid portion connected to an upper peripheral edge of the upper skirt portion of the main body by a living hinge. The lid portion is movable from an open position to a closed position. The lid portion has an upper lid wall, an annular sealing wall depending from the upper lid wall, and an outer lid skirt depending from the upper lid wall. The annular sealing wall and outer lid skirt are configured to frictionally seal the lid portion to the main body portion when the lid is in the closed position.

When a consumer wishes to dispense a product from the container, the consumer opens an exit orifice that is defined on the lid portion and positioned so that it is at the front of the main body portion when the lid is in the closed position. The consumer may open and close the exit orifice by rotating a hinged closure tab that is attached to the upper lid wall.

The consumer may open or close the exit orifice before or after filling the measuring reservoir. When filling the reservoir when the exit orifice is open, a shroud depending from the upper lid wall of the lid portion is positioned between the entrance conduit and the exit orifice. The shroud prevents the product from being squeezed directly from the container out of the exit orifice.

To prevent the exit orifice from being opened by a child, the dispensing closure includes a child-resistant a locking structure. The child-resistant locking structure has at least one actuator tab formed on the outer lid skirt. The actuator tab has an upper latch tab portion extending upwardly from the outer lid skirt and a lower actuator tab portion extending downwardly from the outer lid skirt. A latch extends inwardly from the upper actuator tab end. A corresponding locking ledge is located on the peripheral side edge of the hinged closure tab. The latch and the locking ledge are configured for interlocking engagement when the exit orifice is closed by the hinged closure tab. The actuator tab is pivotable about the outer lid skirt whereby inward depression of the actuator tab portion causes a corresponding outward displacement of the upper latch portion to disengage the latch from the locking ledge. When the latch disengaged, the closure tab can be disengaged from the exit orifice.

Thus, when the consumer squeezes the container, a flowable product is forced through the dip tube, then through the entrance conduit, and into the closure interior. The shroud wall prevents the product from being squirted directly from the entrance conduit through the exit orifice. When the consumer releases pressure from the walls of the container, the flowable product in excess of the predetermined dose drains from the interior through the entrance conduit leaving a measured dose within the measuring reservoir. The top edge of the conduit defines the upper level of the product in the measuring reservoir when draining back into the container. The consumer can then dispense the predetermined dose through the exit orifice by opening the exit orifice and tipping or inverting the dispensing closure.

Accordingly, it can be seen that the instant invention provides a one-piece self-leveling measured dose dispensing closure. The dispensing closure is easy to use. At the same time, the dispensing closure provides a child-resistant feature to prevent unintended access to a product by children. Also, the dispensing closure cleanly dispenses a product from a container without the need for additional measuring equipment. The dispensing closure can be formed as a single piece. The dispensing closure can be used with a standard bottle.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of the various and exemplary embodiments of the invention when read in conjunction with the accompanying drawings wherein:

DETAILED DESCRIPTION OF THE INVENTION

Figure 1:
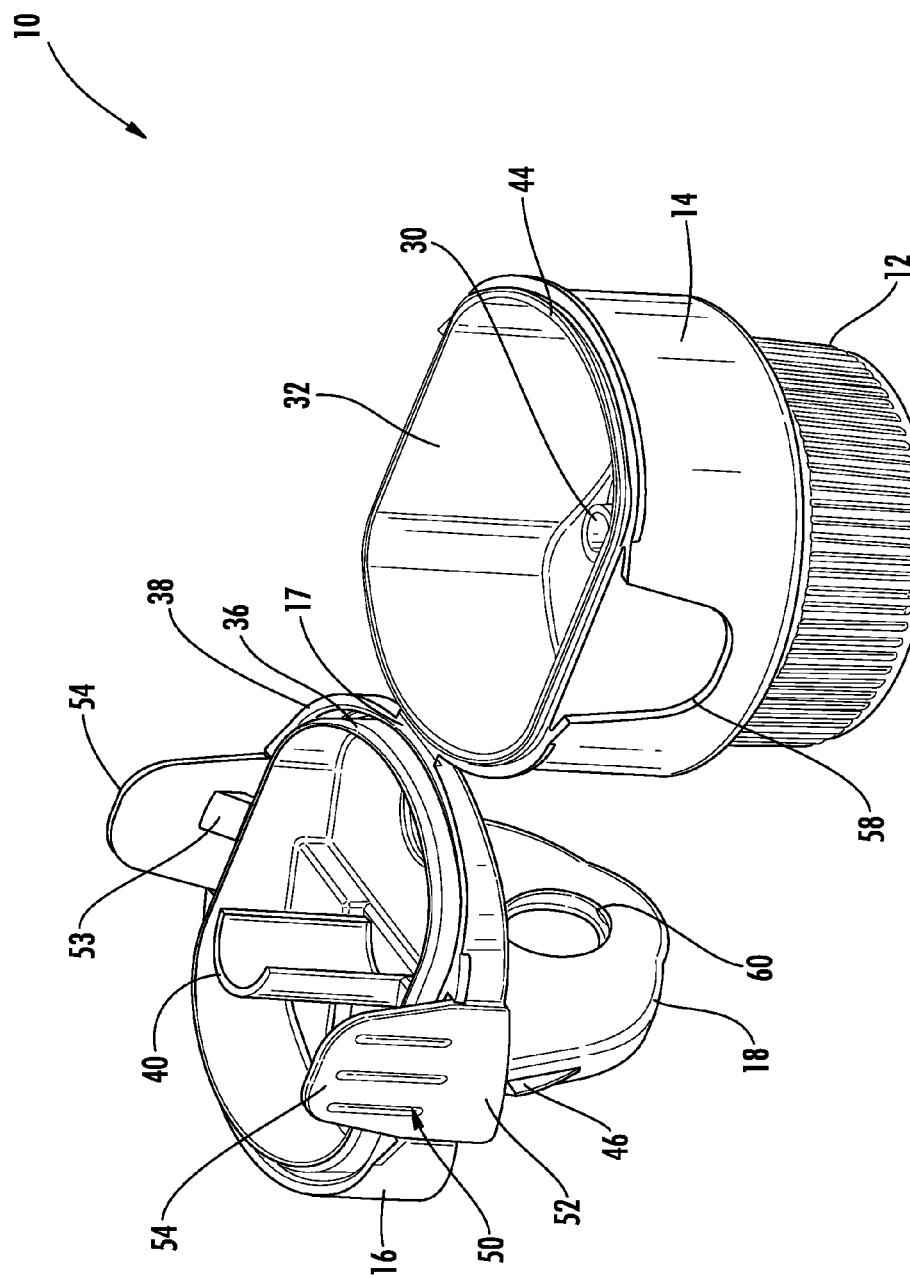
FIG. 1 is a perspective view of the dispensing closure of the present invention in an open configuration.

Referring now to the drawings, the one piece squeeze measured dose dispensing closure of the instant invention is illustrated and generally indicated at 10 in FIGS. 1-15. As will hereinafter be more fully described, the instant invention relates to dispensing closures for containers for flowable products such as personal care products, concentrated beverages, food products, and healthcare products, and more particularly to a dispensing closure that can measure a dose of a product by squeezing the product container to fill a measuring reservoir and then dispense the dose through an exit orifice when the dispensing closure is tilted forward.

Figure 2:
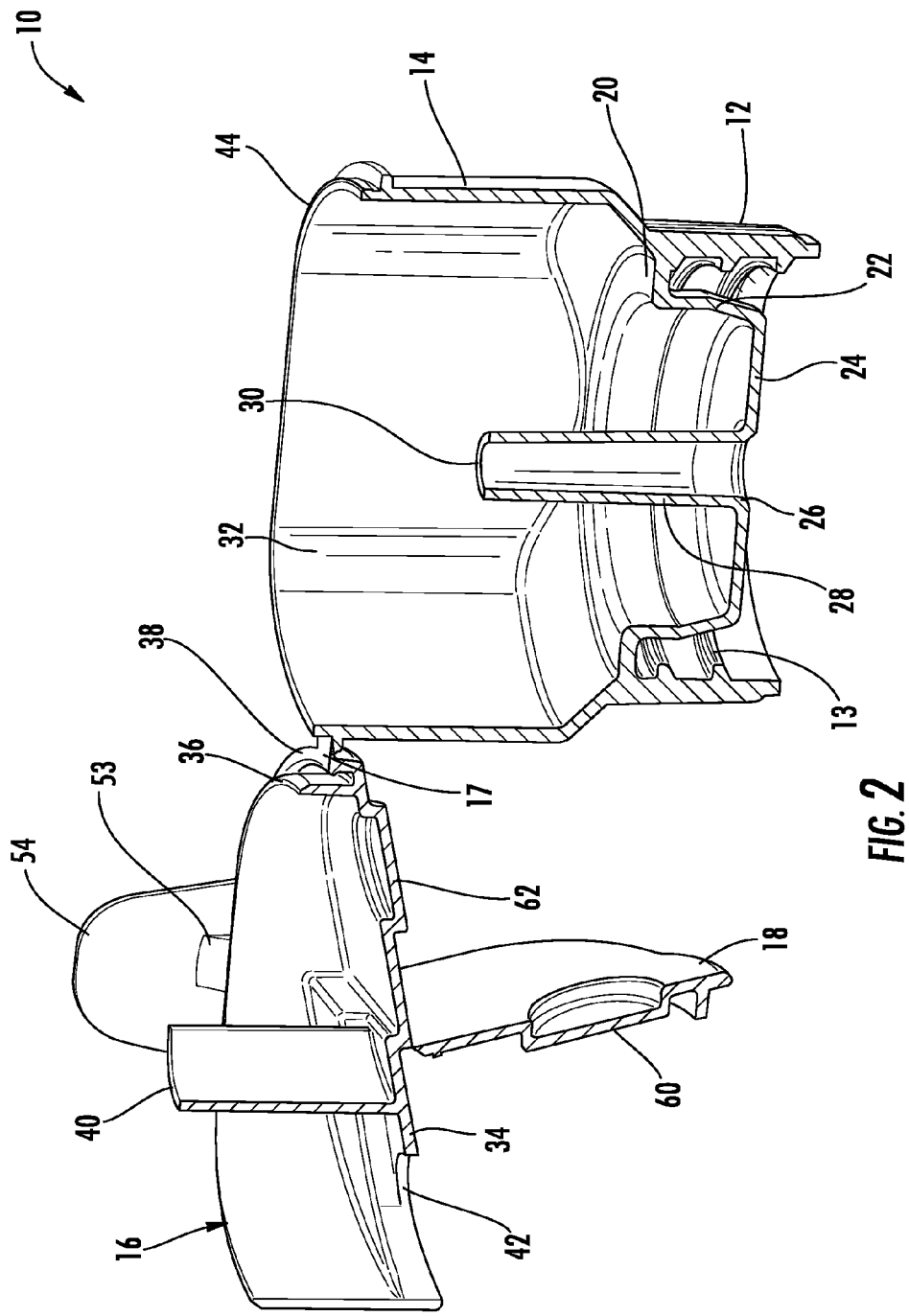
FIG. 2 is a sectional view thereof.

The dispensing closure 10 may be formed by injection molding or another method. It may be formed from plastic or other materials. FIG. 1 shows an exemplary embodiment of the child-resistant single-dose dispensing closure of the present invention. FIG. 2 shows a perspective sectional view of the dispensing closure 10.

The dispensing closure 10 has a main body portion having a middle deck, from which a lower skirt 12 depends downwardly and an upper skirt 14 extends upwardly. The lower skirt 12 provides a sealed attachment of the main body to a product container (not shown) around an opening on the container, so that any product that passes through the container opening is directed into the main body of the dispensing closure, as described below, and does not leak out between the product container and the lower skirt 12 of the main body. In the sectional view of the exemplary embodiment shown in FIG. 2, threads 13 are formed on the inner surface of the lower skirt 12 for engaging an outwardly threaded neck on a product container. Other methods of securing the lower skirt 12 to a container are possible without departing from the scope of the present invention. The dispensing closure 10 can be configured to fit stock bottle necks.

In FIG. 2, the middle deck has a horizontally extending deck wall 20, an annular side wall 22 depending downwardly from the horizontally extending deck wall 20, and a bottom wall 24. The bottom wall 24 defines a dip tube receiver 26 for receiving a dip tube (not shown) that extends to the bottom of the product container. An entrance conduit 28 extends upwardly from the bottom wall 24, and there is an opening 30 formed on the upper end of the entrance conduit.

When a dip tube (not shown) is received in the dip tube receiver 26, the dip tube and entrance conduit 28 form a path for a fluid to flow from the bottom of the product container, through the lower skirt 12, and into the upper skirt 14.

When the product container is squeezed, the flowable product is forced from the bottom of the container into a measuring reservoir in the upper skirt 14. The measuring reservoir is defined by the middle deck, the outer surface of the entrance conduit 28, and the interior surface 32 of the upper skirt 14. The measuring reservoir is designed to measure and retain only a predetermined dose of a flowable product. Once a user has squeezed enough fluid from the container into the measuring reservoir that the level of the fluid within the reservoir is above the height of the opening 30 on the entrance conduit 28 (when measured from the bottom wall 24), the user releases pressure on the product container. This allows any fluid above the height of the entrance conduit opening 30 to flow back into the container through the entrance conduit 28. Regardless of how much excess fluid the user initially squeezes into the measuring reservoir, the excess will be sucked back into the container as the container returns to its undeformed shape, and the user will be left with a precisely measured amount of fluid in the measuring reservoir.

In alternative embodiments, the middle deck might not include the annular side wall 22. For example, the middle deck could be a single horizontally extending deck wall, with a dip tube receiver and an entrance conduit defined on the horizontally extending deck wall. In other embodiments, the annular side wall 22 may be shorter. Altering the dimensions and geometry of the middle deck and the entrance conduit can alter the volume of the measuring reservoir. The dimensions of the measuring reservoir may be different from the relative dimensions shown, to suit the product for use with different products or for applications of products requiring smaller or larger doses.

Figure 3:
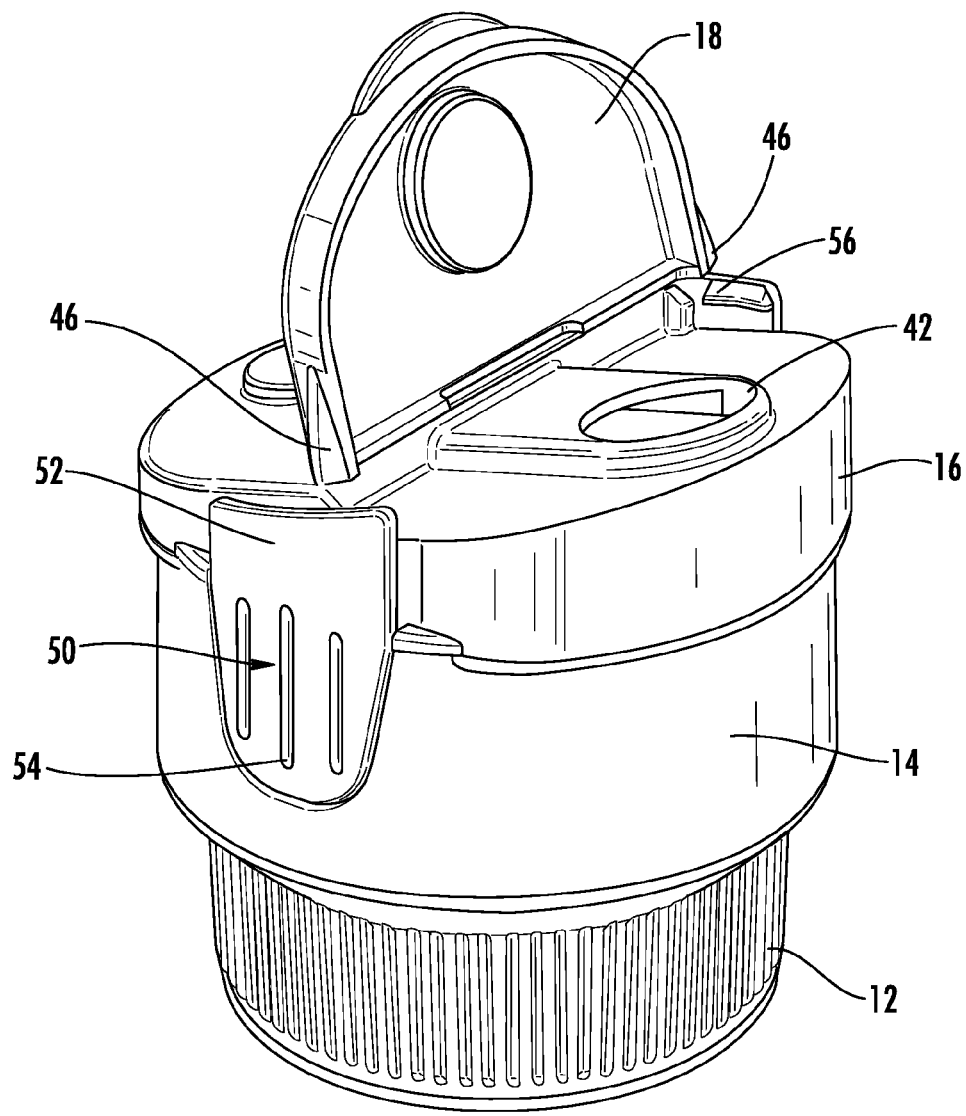
FIG. 3 is a perspective view of the dispensing closure of the present invention with the lid portion in a closed position and the hinged closure tab in an open position.

To allow a user to control when a product is dispensed from the dispensing closure 10, a lid portion 16 is connected to an upper peripheral edge 44 of the upper skirt 14 of the main body by a living hinge 17. The lid portion 16 is movable from an open position to a closed position. The dispensing closure 10 is manufactured in the open position, as shown in FIGS. 1 and 2, and then the lid portion 16 is moved to the closed position, as shown in FIG. 3. When moved to the closed position, the lid portion 16 is snapped into place and sealed to the upper skirt 14.

Figure 4:
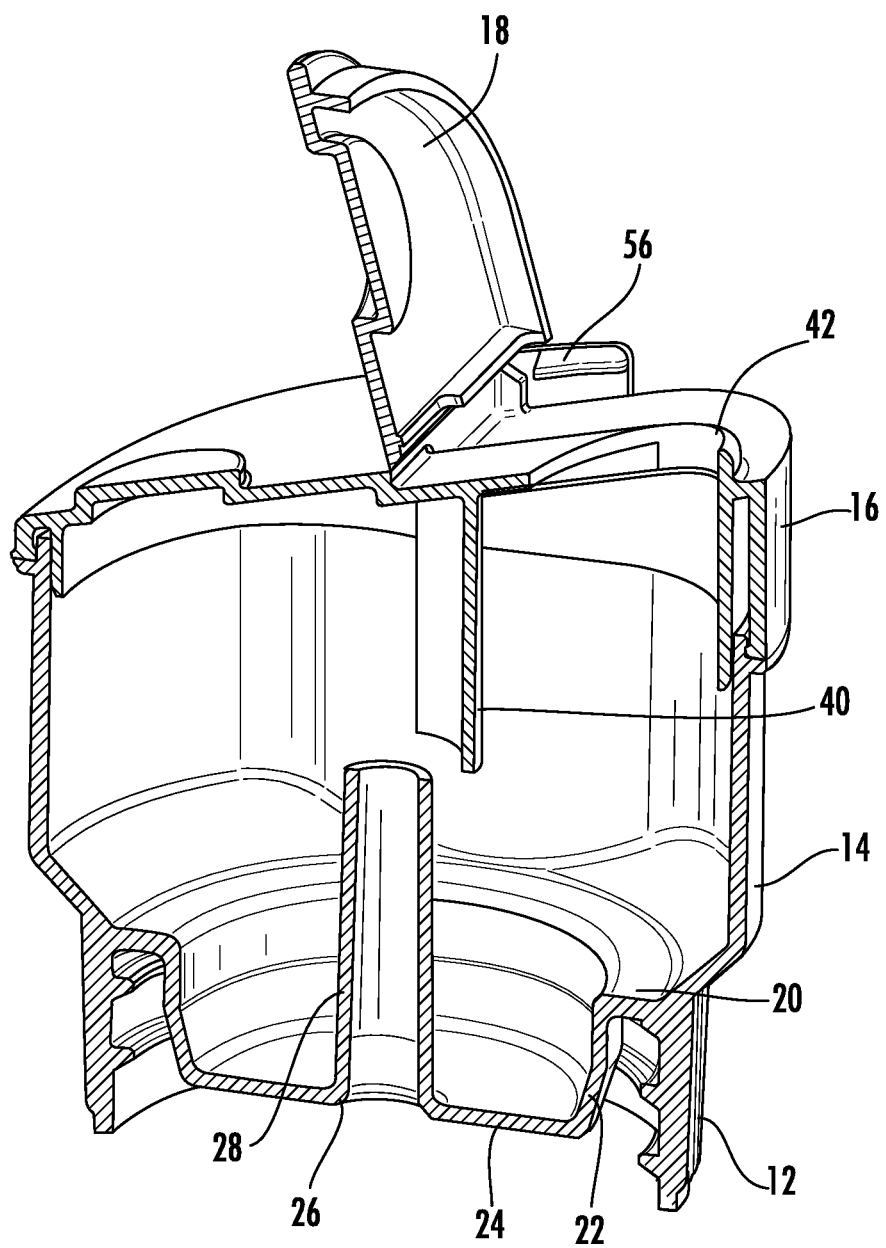
FIG. 4 is a sectional view thereof.

For sealing the dispensing lid portion to the upper skirt 14, the lid portion has an upper lid wall 34, an annular sealing wall 36 depending from the upper lid wall and an outer lid skirt 38 depending from the upper lid wall 34, as shown in FIG. 4. The annular sealing wall 36 and the outer lid skirt 38 are configured to frictionally seal the lid portion 16 to the upper skirt 14 of the main body portion when the lid portion 16 is in the closed position. In the exemplary embodiment, the annular sealing wall 36 and the outer lid skirt 38 engage opposite sides of the upper peripheral edge 44 of the upper skirt 14. The upper peripheral edge 44 of the upper skirt 14 and the outer lid skirt 38 may each have a lip formed thereon to improve the frictional seal of the lid portion 16 to the upper skirt 14.

The user may dispense the predetermined dose of the flowable product from the reservoir of the upper skirt portion 14 through an exit orifice 42 defined on the upper lid wall 34 of the lid portion 16, shown in FIG. 4. The exit orifice 42 is positioned so that it is at the front of the main body portion when the lid portion 16 is in the closed position, so a product flows from the dispensing closure 10 when the dispensing closure 10 is tipped forward or inverted. The exit orifice 42 is also designed so that it allows a flowable product to be cleanly dispensed from the dispensing closure 10.

To provide a clean filling operation when the exit orifice is open, a shroud wall 40 depends from the upper lid wall. The shroud wall 40 prevents the flowable product from being squirted directly from the entrance conduit 28 through the exit orifice 42 formed on the upper lid wall 34. FIG. 4 shows the shroud wall 40 being positioned between the opening 30 on the entrance conduit 28 and the exit orifice 42.

Figure 5A:
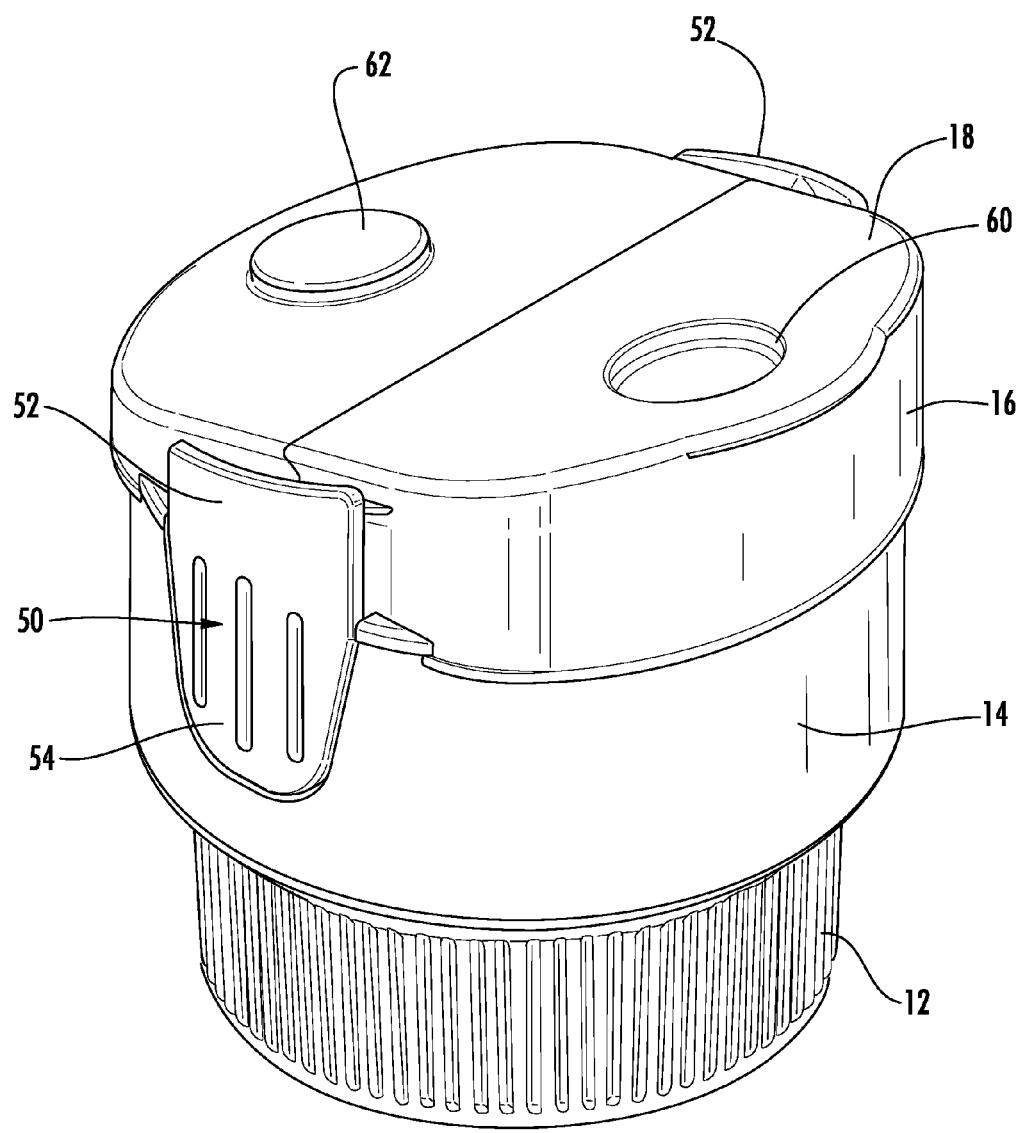
FIG. 5a is a perspective view of the dispensing closure with the lid portion and the closure tabs in closed positions.
Figure 5B:
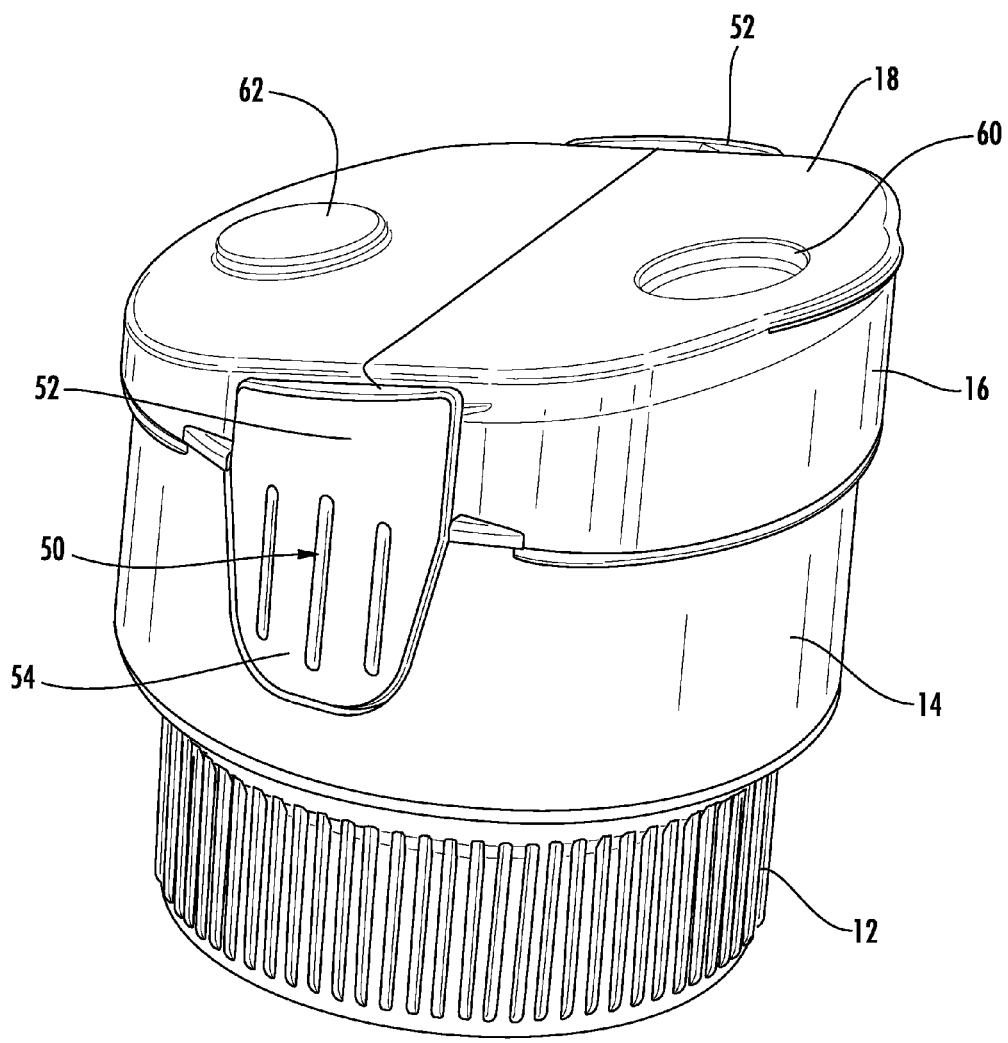
FIG. 5b is a second view thereof.
Figure 6:
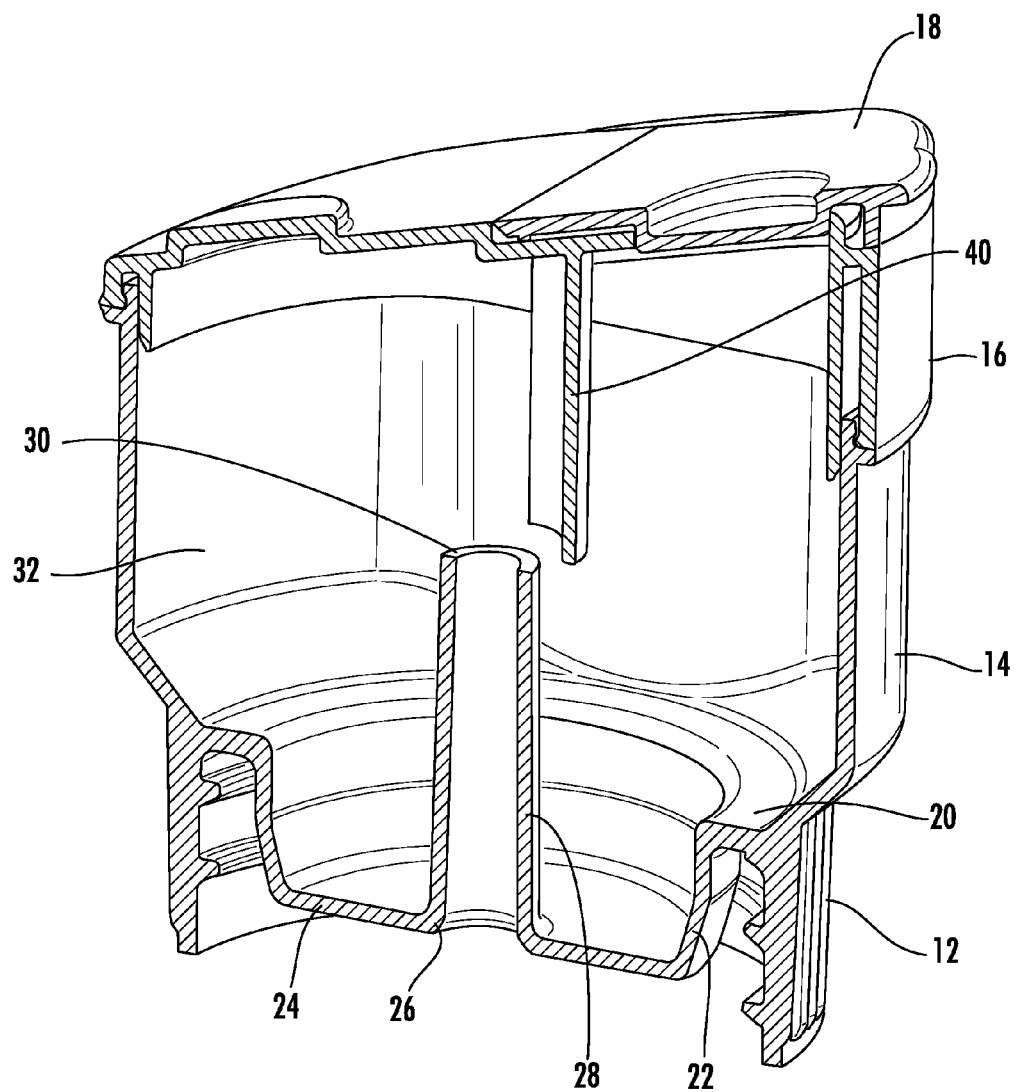
FIG. 6 is a sectional perspective view thereof.
Figure 7:
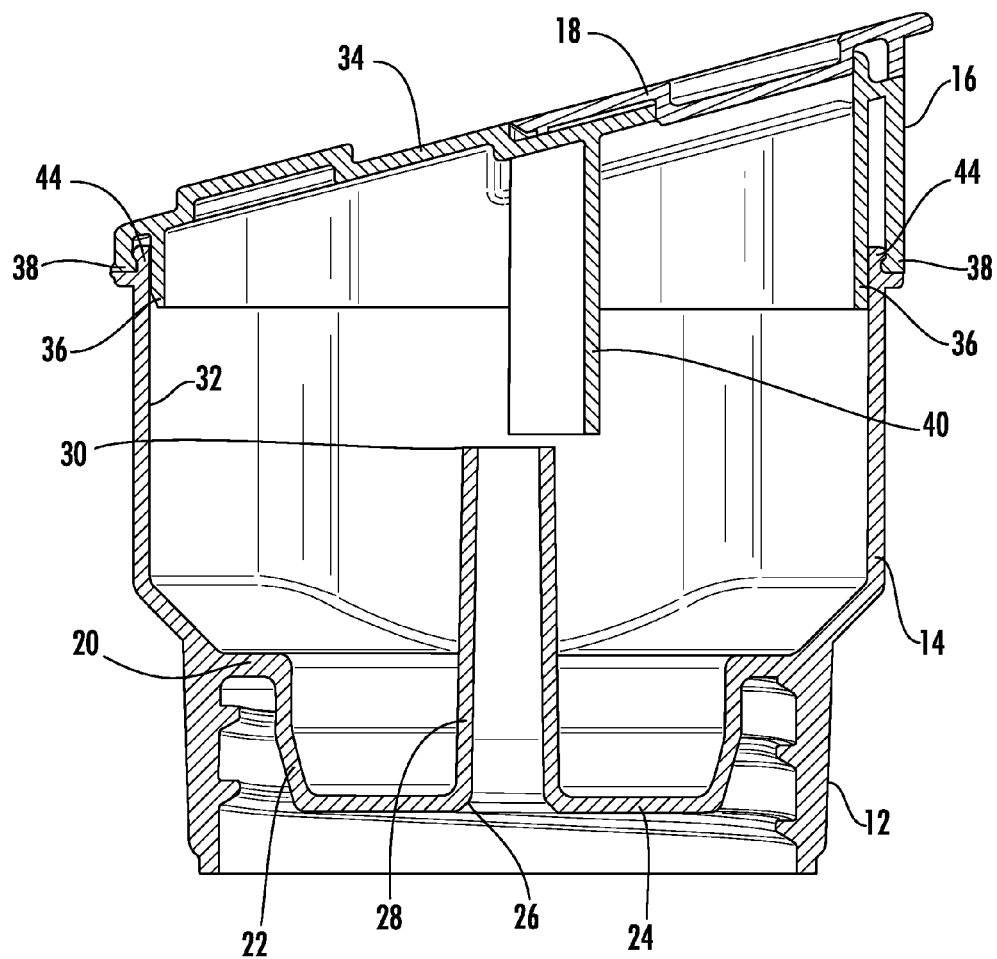
FIG. 7 is a cross-sectional view thereof.

The user may selectively seal or open the exit orifice 42 by rotating a hinged closure tab 18 from an open position to a sealing position, and back. When the hinged closure tab 18 is in the sealing position and the lid portion 16 is in the closed position, the upper skirt 14 of the dispensing closure 10 is sealed. FIGS. 5a and 5b show the dispensing closure 10 with the hinged closure tab 18 sealing the exit orifice 42. FIGS. 6 and 7 provide sectional views showing how the hinged closure tab 18 engages the exit orifice 42 to seal it.

Figure 8:
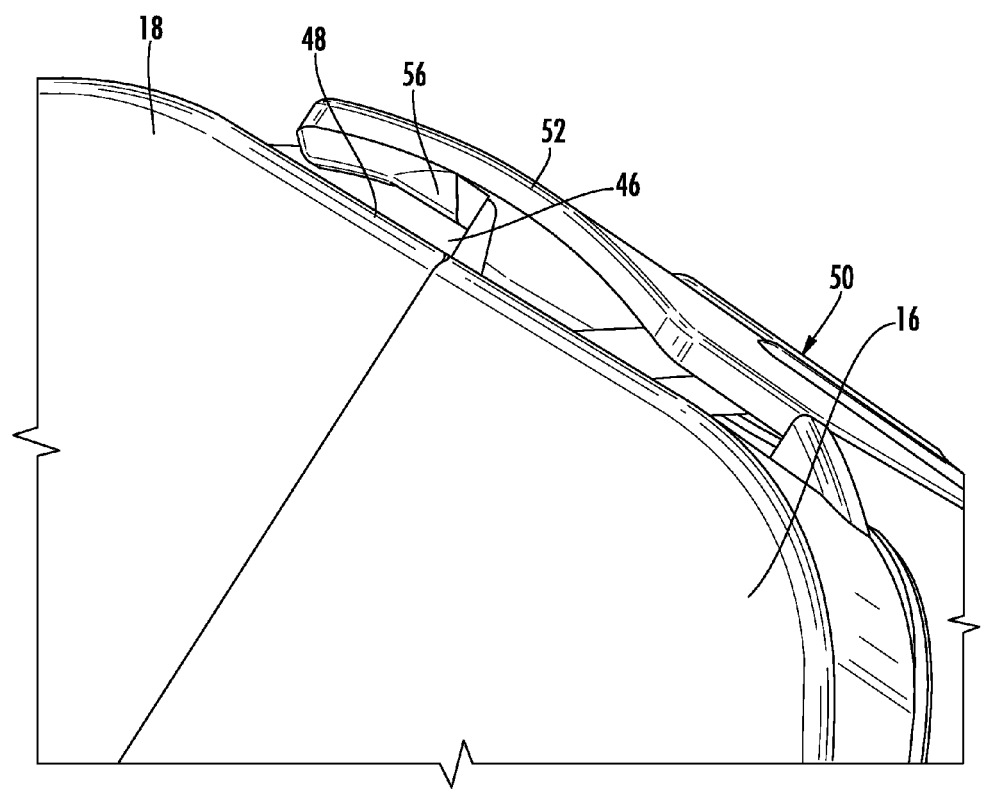
FIG. 8 is a perspective view of the child-resistant latch.

The dispensing closure 10 is distributed to the consumer with the closure tab in the closed position, and held in place by a child-resistant latch. In the exemplary embodiment, a locking ledge 46 that protrudes from a peripheral edge 48 of the hinged closure tab 18 is held in place by a child-resistant latch. The child-resistant latch of the exemplary embodiment is in the form of a tab 50, having an upper latch tab portion 52 and a lower actuator tab portion 54. The upper latch tab portion 52 includes a latch 56 that extends inwardly from the upper latch tab portion 52. The latch 56 and the locking ledge 46 are configured for interlocking engagement when the exit orifice 42 is closed by the hinged closure tab 18. FIG. 8 shows a perspective view of the locking ledge 46 and the latch 56.

Figure 9:
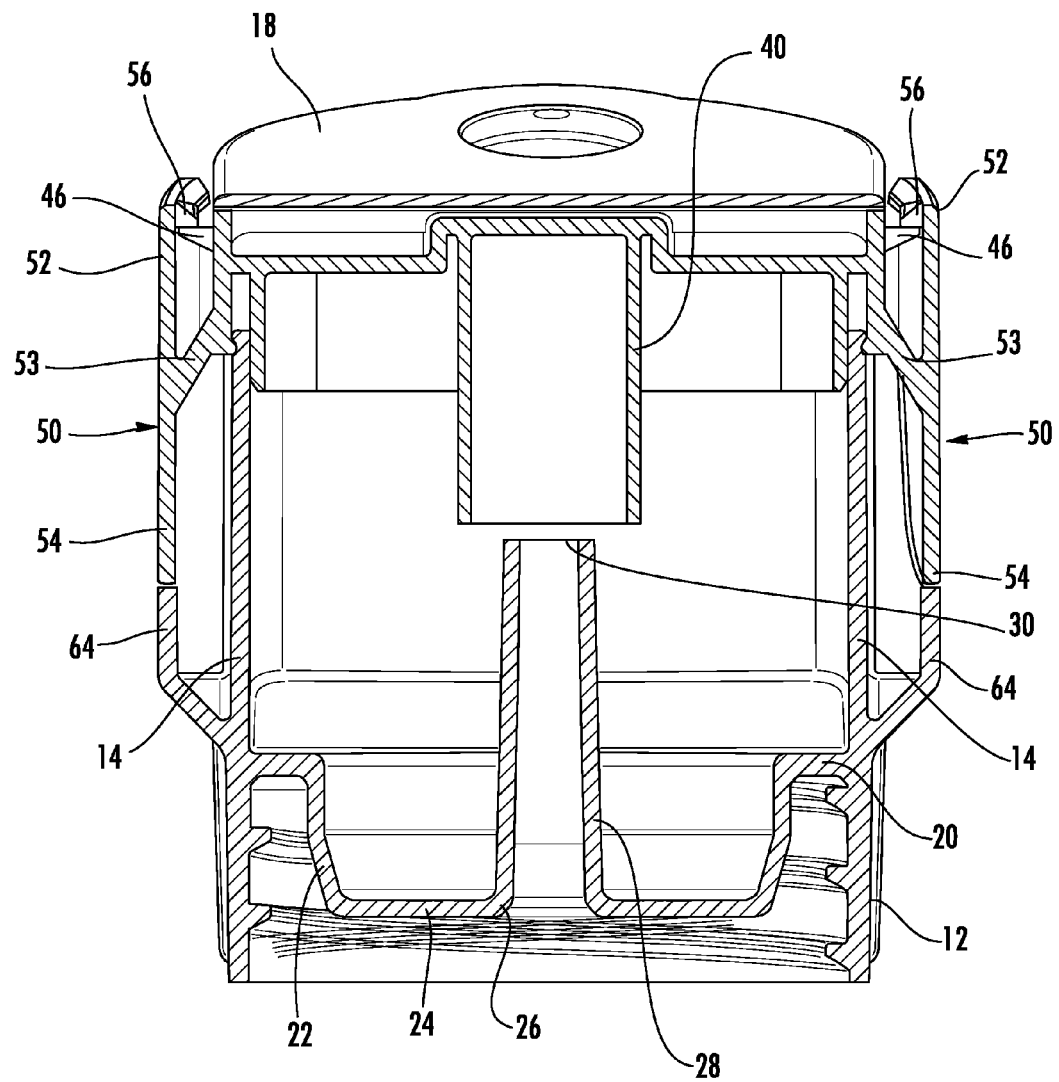
FIG. 9 is a rear cross-sectional view of the dispensing closure.
Figure 10:
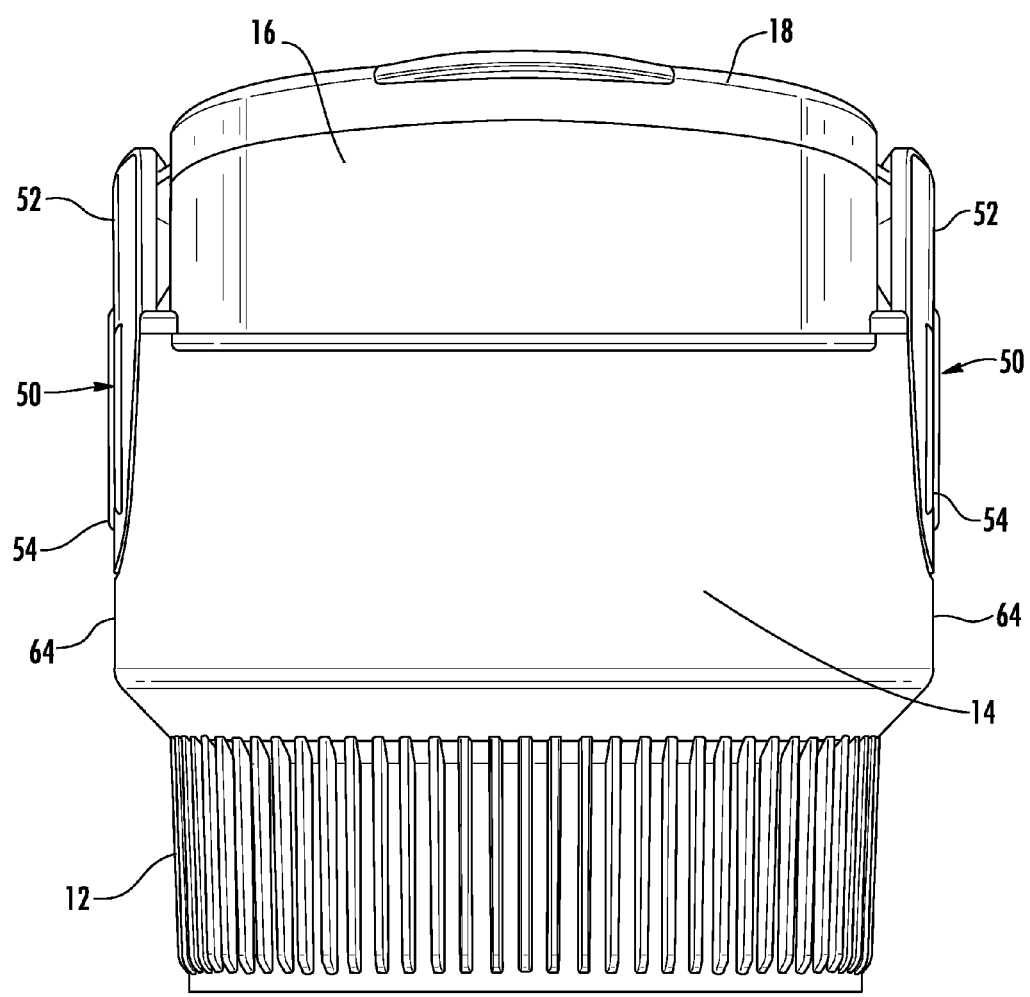
FIG. 10 is a front view of the dispensing closure.
Figure 11:
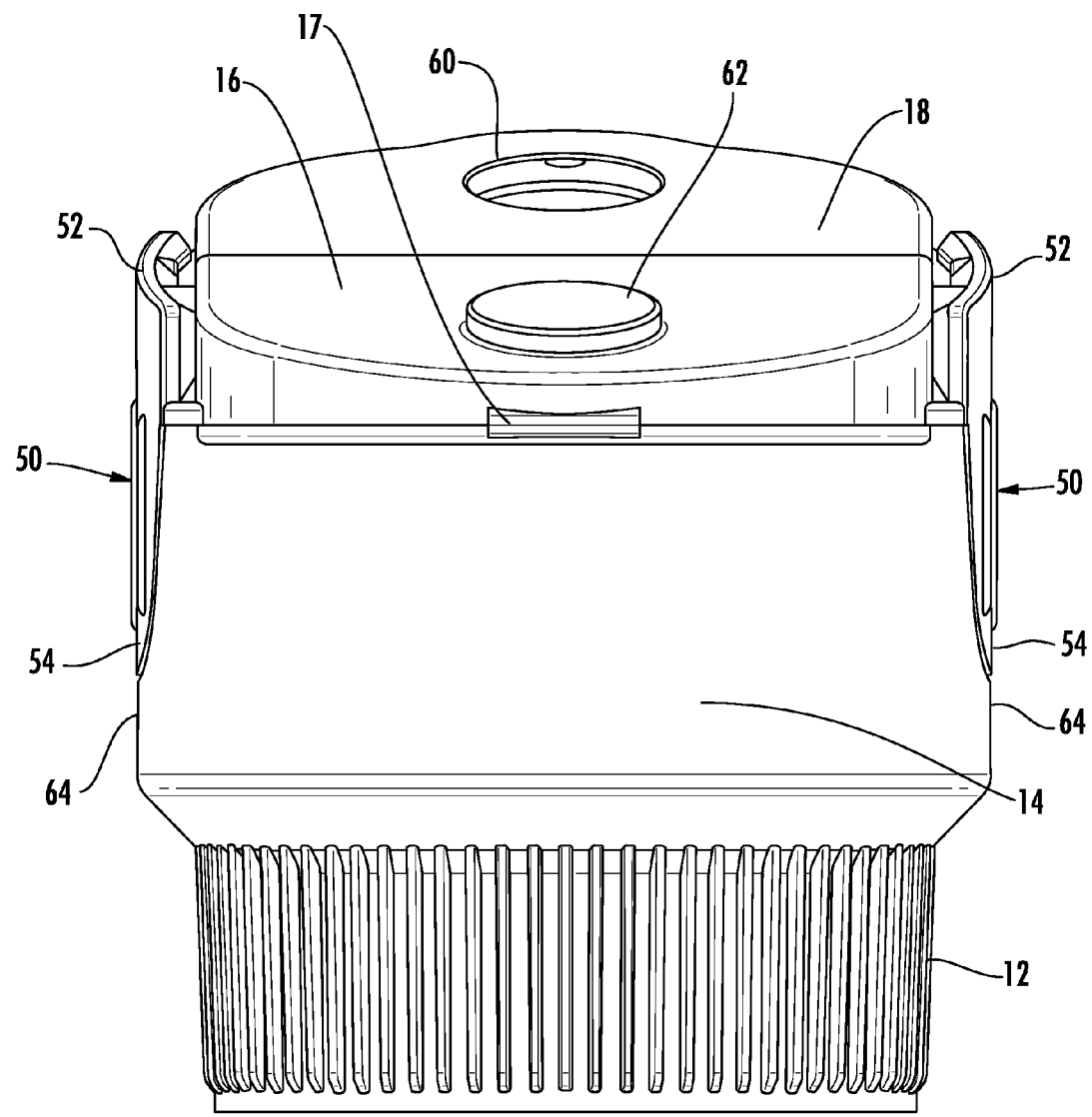
FIG. 11 is a rear view thereof.
Figure 12:
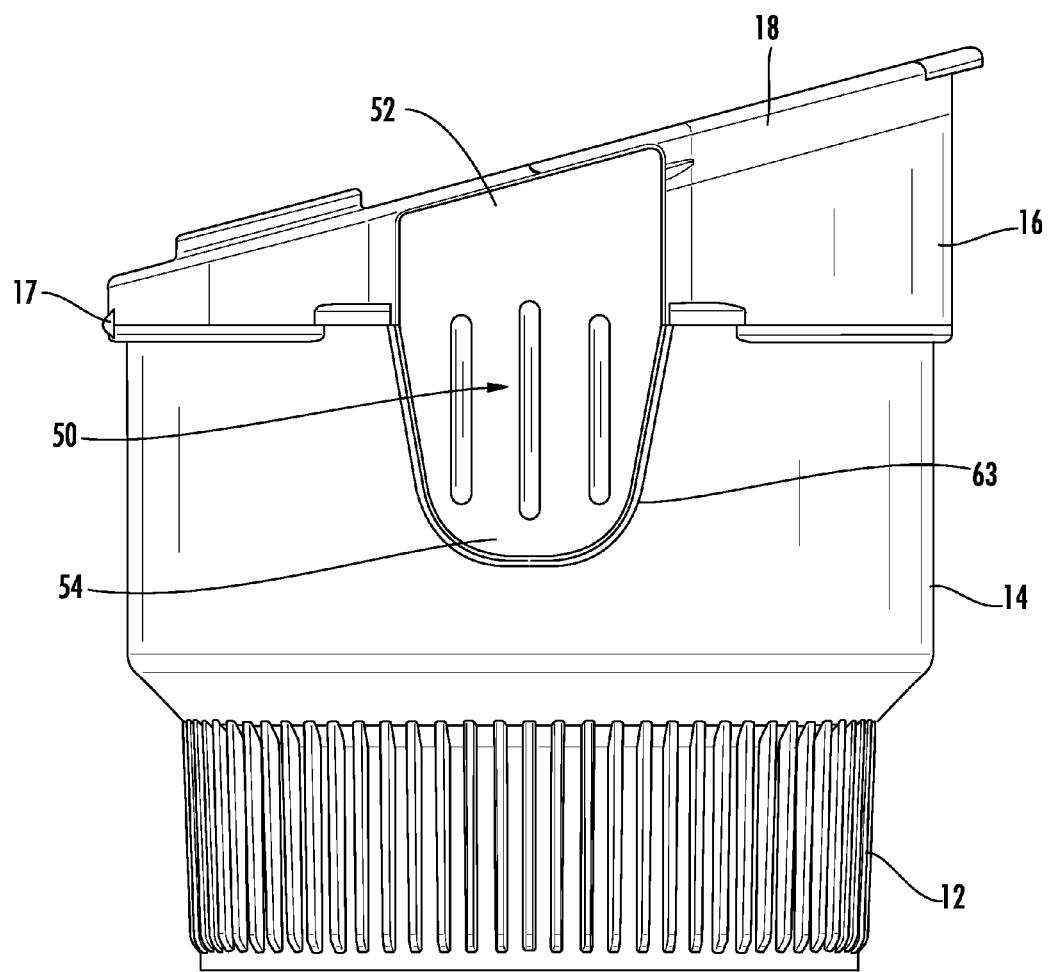
FIG. 12 is a left view thereof.

The operation of the tab is more fully illustrated in FIG. 9. The tab 50 is connected to the lid portion by a tab arm 53, which serves as a fulcrum for the tab 50. The latch 56 and locking ledge 46 can be disengaged by a user when the user inwardly depresses the lower actuator tab 54, causing corresponding outward displacement of the upper latch tab portion 52. When the latch 56 and locking ledge 46 are disengaged, the user may rotate the hinged closure tab 18 so that it disengages the exit orifice 42.

In the exemplary embodiment, there are two child resistant latches positioned on diametrically opposed sides of the upper skirt 14. This is convenient for a user because the user can depress a first actuator tab portion 54 with a middle finger, and a second actuator tab portion 54 with a thumb on the same hand. While squeezing the opposed actuator tab portions 54 towards each other with one hand, the user can lift up the hinged closure tab 18 with a forefinger on the same hand. Thus, the dispensing closure of the present invention can facilitate single-handed use by an adult, while still providing a child-resistant closure.

There may be more or fewer tabs than the two shown, without departing from the scope of the present invention.

In the exemplary embodiment, for each child-resistant latch on the lid portion, there is a corresponding region on the upper skirt portion where there is a latch guard wall 64. The latch guard wall 64 extends outwardly from the upper skirt portion 14 so that the outer surface of the latch guard wall 64 is substantially flush with the outer surface of the tab 54, as shown in FIG. 9 and in the front and rear views of FIGS. 10 and 11. The latch guard wall 64 prevents foreign objects from entering the space between the tab 50 and the upper skirt wall. Such foreign objects could render the tabs 50 temporarily or permanently inoperable. The latch guard walls also provide an additional surface for a user to grip without depressing the lower actuator tabs 54 and unintentionally unlocking the child-resistant latch.

Figure 13:
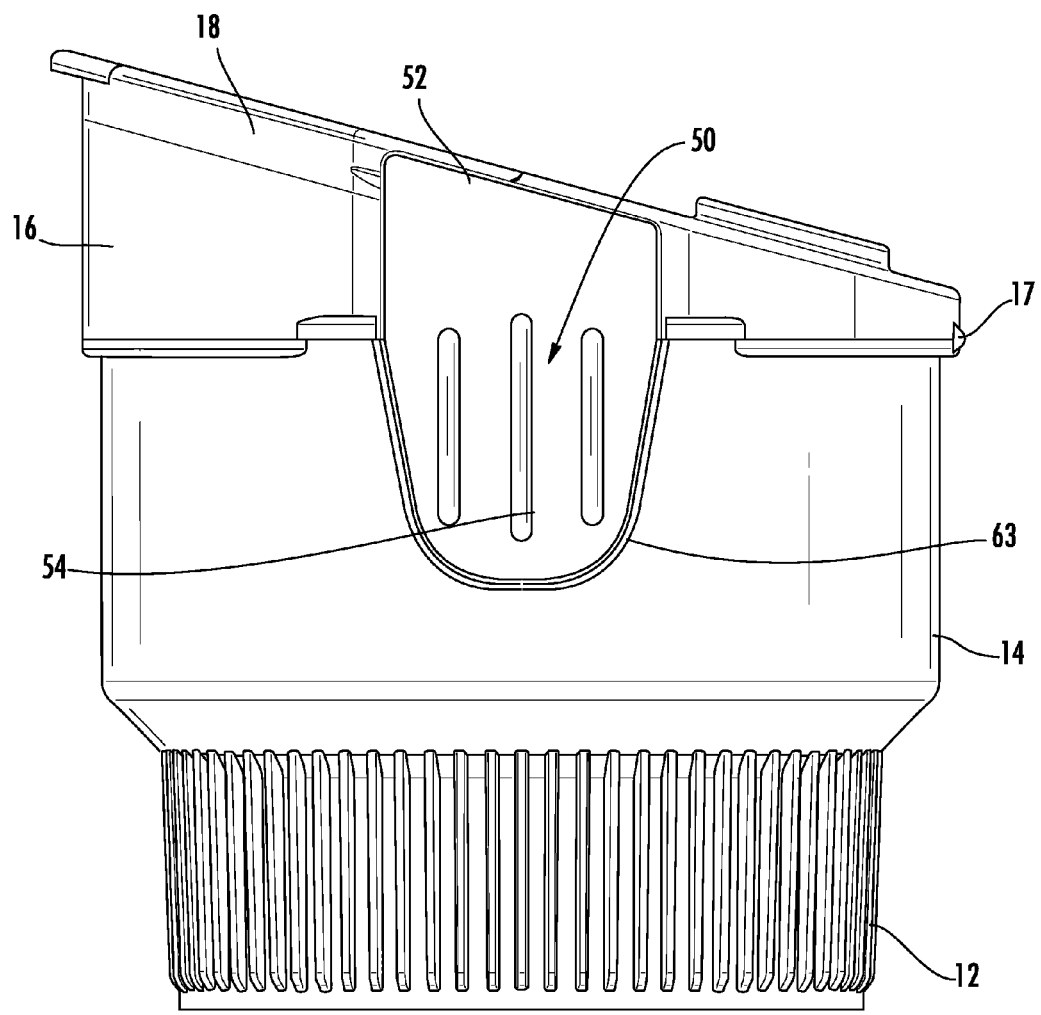
FIG. 13 is a right view thereof.
Figure 14:
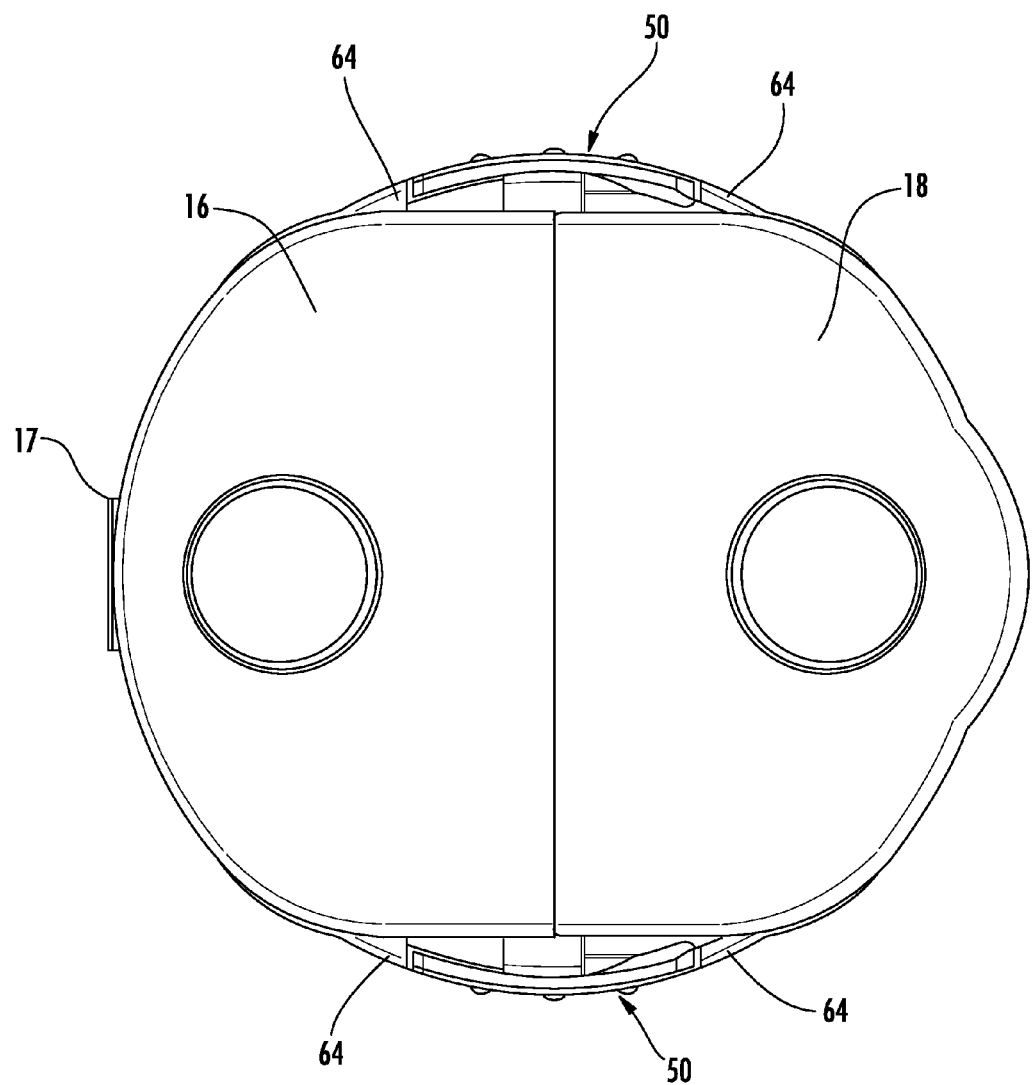
FIG. 14 is a top view thereof.

FIGS. 13 and 14 show left and right views of the exemplary embodiment of the dispensing closure. The tab 50 is configured for interfitting placement adjacent to the edge 63 of the latch guard wall on the upper skirt portion 14. The small gap between the tab 50 and the edge 63 of the latch guard wall when viewed from the left and the right also prevents larger foreign objects from interfering with the operation of the child-resistant latch.

Figure 15:
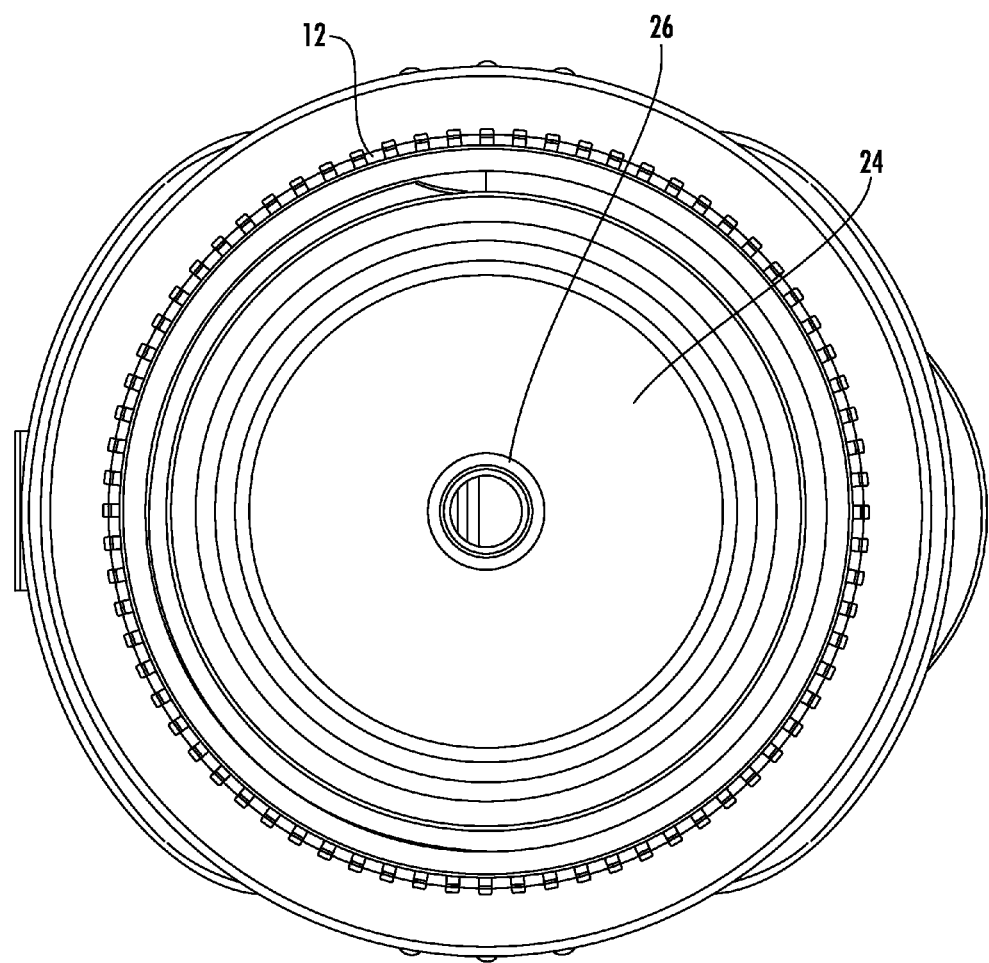
FIG. 15 is a bottom view thereof.

FIGS. 15 and 16 show top and bottom views, respectively, of the dispensing closure 10. Here again, the tabs 50 do not substantially protrude from the outer profile of the latch guard walls 64 of the dispensing closure 10, decreasing the likelihood that a user would accidentally engage the tabs 50 when handling the dispensing closure.

To ensure that a user can cleanly pour a product from the dispensing closure 10, the hinged closure tab 18 may be latched back against the lid portion 16, to keep the hinged closure tab 18 out of the stream of the product being dispensed from the dispensing closure 10. A latch back protrusion 62 extends upwardly from the upper surface of the lid portion, and a corresponding latch recess 60 is defined on the upper surface of the hinged closure tab 18. When the user rotates the hinged closure tab 18 away from the exit orifice 42, the user may frictionally engage the latch back protrusion 62 with the latch recess 60, thus securing the hinged closure tab 18 in an open position so that it does not interfere with product being dispensed from the exit orifice 42.

It can therefore be seen that the child-resistant single dose dispensing closure of the present invention provides a one-piece self-leveling measured dose dispensing closure. The dispensing closure is easy to use, while also providing a child-resistant feature to prevent unintended access to a product by children. Also, the dispensing closure cleanly dispenses a product from a container without the need for additional measuring equipment. The dispensing closure can be formed as a single piece, and can used with a standard bottle. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing closure for dispensing a flowable product from a product container, said dispensing closure comprising:
    a main body portion having a middle deck, a lower skirt portion extending downwardly from the middle deck, and an upper skirt portion extending upwardly from the middle deck;
    said lower skirt portion being configured and arranged to be secured to a product container;

said main body portion having a front and a rear;
said middle deck including a dip tube receiver, an entrance conduit formed at an edge of said dip tube receiver and extending upwardly from a bottom wall, said entrance conduit having an outer surface, said entrance conduit also having an opening defined at an upper end thereof,
said middle deck, said outer surface of said entrance conduit, and an interior surface of said upper skirt portion cooperating to form an interior measuring reservoir for measuring a predetermined dose of said flowable product;
said dip tube receiver and said entrance conduit together forming a path for fluid to pass into said interior measuring reservoir;
a lid portion connected to said upper skirt portion of said main body portion, said lid portion being movable from an open position to a closed position;
an exit orifice defined on said lid portion and positioned so that it is at the front of said main body portion when said lid portion is in said closed position;
an exit orifice closure tab;
a locking ledge protruding from a peripheral side edge of said closure tab; and
a child-resistant latch formed on an outer lid skirt, said child-resistant latch having an upper latch tab portion and a lower actuator tab portion, said upper latch tab portion including a latch extending inwardly from said upper latch tab portion,
said latch and said locking ledge being configured for interlocking engagement when said exit orifice is closed by said closure tab,
said lower actuator tab portion being inwardly depressible to cause a corresponding outward displacement of said upper latch tab portion so that said latch disengages from said locking ledge allowing said closure tab to be disengaged from said exit orifice;
whereby said flowable product enters said dispensing closure from said product container through said entrance conduit, and further whereby said flowable product in excess of said predetermined dose drains from said measuring reservoir through said entrance conduit when pressure is removed from said container, and said product passes from said measuring reservoir through said exit orifice when said exit orifice is opened and said product container is inverted.

2. The dispensing closure of claim 1 wherein said lid portion has an upper lid wall, an annular sealing wall depending from said upper lid wall, and an outer lid skirt depending from said upper lid wall, said annular sealing wall and said outer lid skirt being configured to frictionally seal said lid portion to said main body portion when in said closed position.

3. The dispensing closure of claim 2 wherein said exit orifice closure tab is hinged and is attached to said upper lid wall for opening and closing said exit orifice.

4. The dispensing closure of claim 3 further comprising a shroud wall depending from said upper lid wall, said shroud wall preventing said product from being squirted directly from said entrance conduit through said exit orifice.

5. The dispensing closure of claim 2 further comprising a shroud wall depending from said upper lid wall, said shroud wall preventing said product from being squirted directly from said entrance conduit through said exit orifice.

6. The dispensing closure of claim 1, wherein said lid portion has an upper lid wall, wherein said exit orifice closure tab is hinged and is attached to said upper lid wall for opening and closing said exit orifice.

7. The dispensing closure of claim 6 further comprising a shroud wall depending from said upper lid wall, said shroud wall preventing said product from being squirted directly from said entrance conduit through said exit orifice.

8. The dispensing closure of claim 1, wherein said lid portion has an upper lid wall, the dispensing closure further comprising a shroud wall depending from said upper lid wall, said shroud wall preventing said product from being squirted directly from said entrance conduit through said exit orifice.

9. A dispensing closure for dispensing a flowable product from a product container, said dispensing closure comprising:
a main body portion having a middle deck, a lower skirt portion extending downwardly from the middle deck, and an upper skirt portion extending upwardly from the middle deck;
said lower skirt portion having an inner surface configured and arranged to be secured to a product container;
said main body portion having a front and a rear;
said middle deck having a bottom wall, said bottom wall defining a dip tube receiver, an entrance conduit formed at an edge of said dip tube receiver and extending upwardly from said bottom wall, said entrance conduit having an outer surface, said entrance conduit also having an opening defined at an upper end thereof,
said bottom wall of said middle deck, said outer surface of said entrance conduit, and an interior surface of said upper skirt portion cooperating to form an interior measuring reservoir for measuring a predetermined dose of said flowable product;
said dip tube receiver and said entrance conduit together forming a path for fluid to pass into said interior measuring reservoir;
a lid portion connected to an upper peripheral edge of said upper skirt portion of said main body portion by a living hinge, said lid portion being movable from an open position to a closed position;
said lid portion having an upper lid wall, an annular sealing wall depending from said upper lid wall, a shroud wall depending from said upper lid wall, and an outer lid skirt depending from said upper lid wall, said annular sealing wall and said outer lid skirt being configured to frictionally seal said lid portion to said main body portion when in said closed position;
an exit orifice defined on said lid portion and positioned so that it is at the front of said main body portion when said lid portion is in said closed position;
a hinged closure tab attached to said upper lid wall for opening and closing said exit orifice;
a locking ledge protruding from a peripheral side edge of said hinged closure tab; and
a child-resistant latch formed on said outer lid skirt, said child-resistant latch having an upper latch tab portion and a lower actuator tab portion, said upper latch tab portion including a latch extending inwardly from said upper latch tab portion,
said latch and said locking ledge being configured for interlocking engagement when said exit orifice is closed by said hinged closure tab,
said lower actuator tab portion being inwardly depressible to cause a corresponding outward displacement of said upper latch tab portion so that said latch disengages from said locking ledge allowing a second hinged closure tab to be disengaged from said exit orifice;
whereby said flowable product enters said dispensing closure from said product container through said entrance conduit, said shroud wall preventing said product from being squirted directly from said entrance conduit through said exit orifice, and further whereby said flowable product in excess of said predetermined dose drains from said measuring reservoir through said entrance conduit when pressure is removed from said container, and said product passes from said measuring reservoir through said exit orifice when said exit orifice is opened and said product container is inverted.

10. A dispensing closure for dispensing a flowable product from a product container, said dispensing closure comprising:
a main body portion having a middle deck, an upper skirt portion extending upwardly from the middle deck;
said middle deck including an entrance conduit said entrance conduit having an outer surface, said entrance conduit also having an opening defined at an upper end thereof,
said middle deck, said outer surface of said entrance conduit, and an interior surface of said upper skirt portion cooperating to form an interior measuring reservoir for measuring a predetermined dose of said flowable product;
said entrance conduit forming a path for fluid to pass into said interior measuring reservoir;
a lid portion connected to said upper skirt portion of said main body portion, said lid portion being movable from an open position to a closed position;
an exit orifice defined on said lid portion;
an exit orifice closure tab;
a locking ledge protruding from a peripheral side edge of said closure tab; and
a child-resistant latch formed on an outer lid skirt, said child-resistant latch having a latch tab portion and an actuator tab portion, said latch tab portion including a latch extending inwardly from said latch tab portion,
said latch and said locking ledge being configured for interlocking engagement when said exit orifice is closed be said closure tab,
said actuator tab portion being inwardly depressible to cause a corresponding outward displacement of said latch tab portion so that said latch disengages from said locking ledge allowing said closure tab to be disengaged from said exit orifice;
whereby said flowable product can enter dispensing closure through said entrance conduit, and further whereby said flowable product in excess of said predetermined dose can drain from said measuring reservoir through said entrance conduit, and said product can pass from said measuring reservoir through said exit orifice.

11. The dispensing closure of claim 10 wherein said lid portion has an upper lid wall, an annular sealing wall depending from said upper lid wall, and an outer lid skirt depending from said upper lid wall, said annular sealing wall and said outer lid skirt being configured to frictionally seal said lid portion to said main body when in said closed position.

12. The dispensing closure of claim 11 wherein said exit orifice closure tab is hinged and is attached to said upper lid wall for opening and closing said exit orifice.

13. The dispending closure of claim 12 further comprising a shroud wall depending from said upper lid wall, said shroud wall preventing said product from being squirted directly from said entrance conduit through said exit orifice.

14. The dispensing closure of claim 11 further comprising a shroud wall depending from said upper lid wall, said shroud wall preventing said product from being squirted directly from said entrance conduit through said exit orifice.

15. The dispensing closure of claim 10, wherein said lid portion has an upper lid wall, wherein said exit orifice closure tab is hinged and is attached to said upper lid wall for opening and closing said exit orifice.

16. The dispensing closure of claim 15 further comprising a shroud wall depending from said upper lid wall, said shroud wall preventing said product from being squirted directly from said entrance conduit through said exit orifice.

17. The dispensing closure of claim 10, wherein said lid portion has an upper lid wall, the dispensing closure further comprising a shroud wall depending from said upper lid wall, said shroud wall preventing said product from being squirted directly from said entrance conduit through said exit orifice.

* * * * *